M. WOODARD.
Seed Sower and Corn Cultivator.

No. 88,253. Patented March 23, 1869.

Witnesses:
Cornelius Cox
Leopold Buell

Inventor,
Martin Woodard
per Alexander V. Mason
Atty

MARTIN WOODARD, OF DES MOINES, IOWA.

Letters Patent No. 88,253, dated March 23, 1869.

IMPROVEMENT IN COMBINED SOWER AND CULTIVATOR.

The Schedule referred to in these Letters Patent and making part of the same.

*To all whom it may concern:*

Be it known that I, MARTIN WOODARD, of Des Moines, in the county of Polk, and in the State of Iowa, have invented certain new and useful Improvements in Combined Seed-Sower and Corn-Cultivator; and do hereby declare that the following is a full, clear, and exact description thereof, reference being had to the accompanying drawings, and to the letters of reference marked thereon.

The nature of my invention consists in the construction and general arrangement of a "combined seed-sower and corn-cultivator," which will be hereinafter fully set forth.

In order to enable others skilled in the art to which my invention appertains, to make and use the same, I will now proceed to describe its construction and operation, referring to the annexed drawings, which form a part of this specification, and in which—

Figure 1:
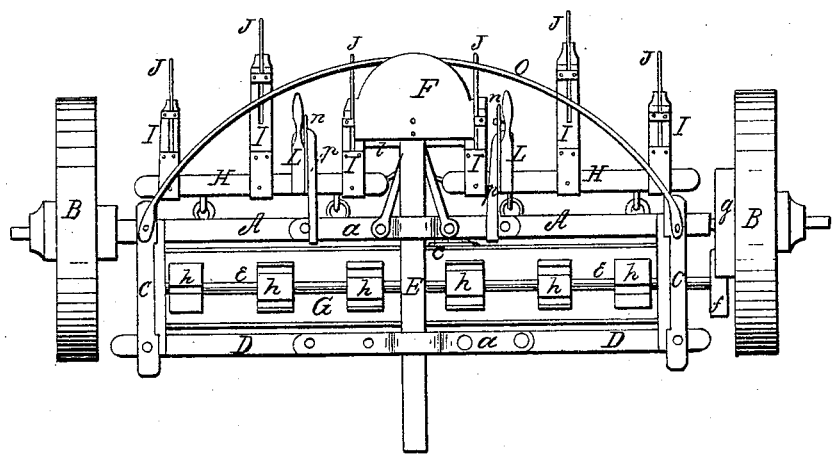

Figure 1 is a plan view, and

Figure 2:
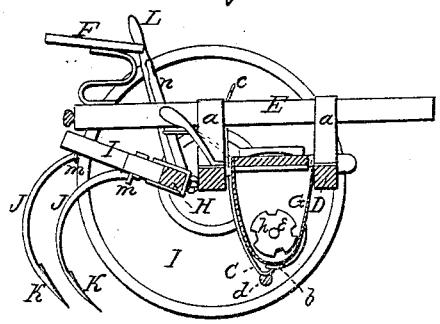

Figure 2, a vertical cross-section.

A represents the axle, on the ends of which the wheels B B are placed.

Near the wheels B B, two arms, C C, project forward from the axle A, and these arms are connected at their front ends by a bar, D, thus forming a frame in which the seed-box, or rather from which the seed-box is suspended.

The axle A, as well as the bar D, may each be of one piece, or each of two pieces, connected near the centre by metal braces.

Above the centre of the frame, formed as above mentioned, and across the same, is placed a beam, E, which beam rests on the metal braces connecting the two parts of the axle A and beam D.

The beam E, being further secured by metal bands *a a*, extends a suitable distance both in front and in rear of the frame mentioned.

On its rear end, the driver's seat, F, is placed, and to its front end the tongue may be secured in any manner desired.

The seed-box G, which is made of bent sheet-iron, or other suitable metal, is placed in the frame formed of the axle A, arms C C, and beam D, and has in its bottom suitable openings for the passage of the seed.

On the under side of the bottom of the seed-box is placed a slide, *b*, with apertures corresponding with the openings in the bottom of the seed-box.

The slide *b* is moved to either side by means of a lever, *c*, attached to said slide, and extending up along the rear side of the seed-box. By this arrangement the openings through which the seed passes may be graduated, thus regulating the quantity of seed discharged, or they may be entirely closed, when so desired.

Under and along the bottom of the seed box is suspended a round bar, *d*, for the purpose of scattering the seed when discharged from the box.

The seed will fall down through the openings, and the bar *d*, being below said openings, the seed will divide, and some of it fall down in front, and the rest in rear of said bar.

In the seed-box G, is placed a shaft, *e*, extending its whole length, and having its bearings in the ends of the seed-box.

One end of the shaft *e* extends beyond the seed-box, and is provided with a small wheel, *f*, which touches another wheel, *g*, attached to one of the driving-wheels, B, so that when the machine is in motion, the shaft *e* is revolved by the friction of the wheels *f* and *g*, without the aid of any belt, cogs, or gearing of any kind.

On the shaft *e* is placed a number of agitators, *h h*, corresponding in number and position with the openings in the bottom of the seed-box. These agitators consist of rollers grooved longitudinally, and placed so as to be close to the bottom and lower portion of the sides of the seed-box.

It will be seen that when the machine is in motion, the seed enters the grooves on the agitators, and is by them carried to the openings in the bottom, no more seed being able to reach said openings except what is fed to them by the agitators.

On the rear side of the axle A, are hinged two bars, H H, which are provided with a series of arms, I I, of unequal length, extending toward the rear.

The rear ends of said arms are slotted, and in them the bent shanks J J are pivoted, the lower ends of said shanks being provided with cultivator teeth, K K.

The two centre arms, I I, are connected by a metal bar, *i*, and between the inner ends of the two bars H H is pivoted another of the arms, I I, which rests on the metal bar *i*, and also has a shank, J, and cultivator-tooth K.

The shanks J J rest on metal loops *m m*, placed on the under side of the arms I, near their outer ends.

From the bars H H extend levers L L, which are provided with springs *n n*, for the purpose of raising the cultivator-teeth out of the ground. They are then held up, by the springs *n n* pressing into notches on bent bars *p p*, placed on the axle A.

When the machine is used as a cultivator, the levers L L rest on a railing, O, thus holding the cultivator-teeth in proper position.

It will be readily seen how the machine operates, without any further explanation on my part.

It saves a great deal of expense to farmers, as it combines, in one, two machines, which have heretofore always been separate.

Having thus fully described my invention,

What I claim as new, and desire to secure by Letters Patent, is—

The arrangement, on the frame A C D, of the removable seed-box G, having longitudinally-grooved agitators *h h*, operated by friction-wheels *f g*, and the bar *d*, under its bottom, with the hinged bars H H, slotted arms I I, pivoted shanks J J, teeth K K, levers L L, and railing M, all substantially as and for the purposes herein set forth.

In testimony that I claim the foregoing, I have hereunto set my hand, this 11th day of August, 1868.

MARTIN WOODARD.

Witnesses:
G. B. HAMMER,
M. D. McHENRY.